United States Patent
Reineke

(10) Patent No.: US 6,260,852 B1
(45) Date of Patent: Jul. 17, 2001

(54) SEALING DEVICE FOR AN ANNULAR GAP BETWEEN TWO SEALING SURFACES OF MACHINE PARTS

(75) Inventor: Frank Reineke, Hannover (DE)

(73) Assignee: Paul Troester Maschinenfabrik, Hannover (DE)

( * ) Notice: Subject to any disclaimer, the term of this patent is extended or adjusted under 35 U.S.C. 154(b) by 0 days.

(21) Appl. No.: 09/013,525

(22) Filed: Jan. 26, 1998

(30) Foreign Application Priority Data

Jan. 27, 1997 (DE) .............................................. 197 02 806

(51) Int. Cl.⁷ .............................. F16J 15/06; B29C 47/08
(52) U.S. Cl. ............................................ 277/609; 277/924
(58) Field of Search ..................................... 277/609, 630, 277/924, 316, 936, 939, 940; 210/780, 447; 425/185, 183, 186

(56) References Cited

U.S. PATENT DOCUMENTS

| | | | |
|---|---|---|---|
| 2,998,288 | * | 8/1961 | Newhouse . |
| 3,583,453 | * | 6/1971 | Upmeier . |
| 3,587,155 | * | 6/1971 | Packard . |
| 3,653,419 | * | 4/1972 | Schutter . |
| 3,675,934 | * | 7/1972 | Heston . |
| 3,684,419 | * | 8/1972 | Voight . |
| 3,856,277 | * | 12/1974 | Tiramani . |
| 3,947,202 | * | 3/1976 | Goller . |
| 3,962,092 | * | 6/1976 | Newman . |
| 3,983,038 | * | 9/1976 | Heston . |
| 4,053,166 | * | 10/1977 | Domkowski . |
| 4,268,237 | * | 5/1981 | Wolters . |
| 4,318,677 | * | 3/1982 | Ullrich . |
| 4,410,189 | * | 10/1983 | Myers . |
| 5,246,236 | * | 9/1993 | Szarka . |
| 5,439,589 | * | 8/1995 | Whitman . |
| 5,840,197 | * | 11/1998 | Ishida . |

FOREIGN PATENT DOCUMENTS

| | | |
|---|---|---|
| 1919269 | 5/1971 | (DE) . |
| 1729396 | 2/1973 | (DE) . |
| 30 43 217 C2 | 11/1980 | (DE) . |
| 196 15 679 A1 | 4/1996 | (DE) . |

* cited by examiner

*Primary Examiner*—Anthony Knight
(74) *Attorney, Agent, or Firm*—Lackenbach Siegel Marzullo Aronson & Greenspan

(57) ABSTRACT

The invention relates to devices for sealing an annular gap between two sealing surfaces of machine parts with the aid of a ring which is in contact on these two sealing surfaces, in particular on extrusion machines, where this sealing is of significance in strainer—and tool-changing devices. It is the task of the invention to create compact very simple constructed sealings built with simple means, which seals operate faultlessly even at very high pressures and yet can be relieved if a machine part is to be displaced against the other. The invention utilizes a substantially planar ring comprising an elastic but very strong material which projects on one side beyond its sealing surface, and this ring through pressure onto the portion of the ring projecting on one side beyond this sealing surface is deformed such that it becomes arched and therein comes to rest with its one marginal edge in contact on the one sealing surface in the form of an annular line and is supported in the form of an annular line on the other sealing surface. The sealing is achieved through two annular line-form sealing surface at which the seal pressing and thus the sealing effect is very high. The ring can be deformed to achieve the sealing or to cancel the sealing effect and annular line-form contact pressing.

7 Claims, 7 Drawing Sheets

SEALING DEVICE FOR AN ANNULAR GAP BETWEEN TWO SEALING SURFACES OF MACHINE PARTS

The invention relates to methods and devices for sealing an annular gap between two sealing surfaces of machine parts with the aid of a ring in contact on these two sealing surfaces, in particular on extrusion machines where this sealing is of significance, preferably in filter and tool-changing devices.

BACKGROUND OF THE INVENTION

In the interior of extrusion machines of the industry processing rubber and synthetic materials, the extrudable material or extrudate is under pressures, in particular at the end of the passage through the extrusion machine where the material is disintegrated and in a flowable state. At this place frequently a filter, also referred to as a strainer, is disposed in the path of the extrudate in order to remove parts and foreign bodies which cannot be disintegrated from the flow of the extrudate, conventionally directly following the extrusion device, which can be a screw extruder, ram extruder, toothed wheel or other extruder, before the extrudate leaves the discharge head disposed at the end of the extrusion device.

The strainers must be cleaned from time to time. In order not to interrupt the production operation for the cleaning, strainer-changing devices were developed which are installed in the extrusion system for example, between extruder and discharge head. These comprise discrete strainer cassettes or a slider with at least two strainers and means for a rapid displacement of this strainer cassette or this slider into their operating positions. Due to the high pressures occurring at the site of the strainer, problems are encountered to attain "perfect" sealing during operation with high contact pressures in the region of the seal, but to decrease briefly the high contact pressures for the displacement of the slider so far that the slider or the strainer cassettes without damage and without damaging the seal used can be slid in order to make them effective again immediately after the displacement of the slider with the strainers or the strainer cassettes.

Also, for the reason of not having to interrupt the production operation or only extremely briefly, similar apparatus are used in the discharge head region as tool changers.

Technology has developed a number of options of which, however, none is fully satisfactory.

In DE 3043217 C2, two meshing rings are hydraulically displaced and pressed against the slider. Since here an annular cylinder comprising two concentrically disposed corrugated pipes causes the hydraulic displacement, and the attainable contact pressures are not sufficient for many applications since the strength of the corrugated pipes fabricated of very thin material is highly limited.

In DE 1919269, the contact pressing takes place by means of a ring which is impressed upon by piston rods, acting obliquely upon it, of small hydraulic cylinders. The sealing of the cylindrical inner circumferential surface of this ring and the occurring transverse forces here represent problems.

In DE 1729396, the compacting pressure is not exerted onto annular surfaces but rather only on two opposing sites via wedge surfaces.

In DE 19615679, A1 mechanical displacement is achieved not with hydraulic forces but rather by rotation of a pressing ring provided with outer threads in an inner threading. High contact pressures, and thus sealing pressures, cannot be attained due to the high frictions and locally unequal contact pressing due to thread tolerances. The resetting with defined residual pressure is also not readily possible.

The invention avoids the disadvantages of the prior art. It is the task of the invention to create with simple means a unique sealing device which seals, for example, an extrusion machine even at very high pressures and yet is readily relieved of load if a machine part is to be displaced relative to the other.

SUMMARY OF THE INVENTION

The invention comprises that either a preferably substantially planar ring comprising an elastic but very strong material is used, which preferably projects unilaterally beyond its sealing surface, and that this ring through pressure onto the portion of the ring projecting on one side beyond this sealing surface is deformed such that it becomes arched and comes to rest in contact in the form of an annular line with its one marginal edge on the one sealing surface and becomes braced in the form of an annular line on the other sealing surface. Alternately, an arched or weakly-truncated cone-form ring comprising an elastic but very strong material is used, which at least on one side projects beyond the sealing surface, and that this ring under pressure is placed sealingly between the two sealing surfaces and is allowed to be in contact in the form of an annular line with its one marginal edge on the one sealing surface and is braced on the other sealing surface in the form of an annular line, and that by introducing force onto the portion of the ring projecting beyond the sealing surface deforms this ring such that losing its arching extends and therein loses the line-form contact position on the one sealing surface.

In both cases, the sealing attained through two annular line-form sealing surfaces at which the surface pressing and thus the sealing effect is very high. In the one case the ring is deformed in order to attain the sealing, in the other, the second case, the ring is deformed in order to cancel the sealing effect and the annular line-form contact pressing in order to be able to displace the strainer cassette or the slider.

This sealing can be applied wherever a gap must be sealed which is slightly greater than the thickness of the portion of the ring to be sealed.

The device according to the invention is realized such that the ring in the region between the two annular line-form contact surfaces is substantially planar and, by introducing force onto the portion projecting beyond the sealing surface, can be arched so that the two annular line-form contact surfaces of the ring are in contact on the sealing surfaces under pressure.

The previously cited two realization options also determine the devices for sealing an annular gap between two planar sealing surfaces of machine parts in particular on extrusion machines:

In the one embodiment, the device according to the invention is implemented such that the ring comprises an elastic but very strong material, that the ring projects at least on one side beyond its sealing surface, that the ring becomes deformed through the effect of force on the portion projecting on one side beyond its sealing surface such that it becomes arched, and that the ring with its one marginal edge is in contact in the form of an annular line on the one sealing surface and is braced in the form of an annular line on the other sealing surface.

The other realization option is distinguished thereby that the ring at least in the region between the two annular line-form contact surfaces is arched or has the form of a truncated cone, that the two annular line-form contact surfaces with the introduction of force are in contact on the sealing surfaces and through pressure onto the portion of the ring projecting beyond the sealing surface at least in the region between the two annular line-form contact surfaces is deformable in a plane and through introduction of force onto the portion of the ring projecting beyond the sealing surface this ring is deformed such that losing its arching extends and therein loses the line-form contact on the one sealing surface.

It is therein of advantage if the ring is fabricated of metal, a high-strength synthetic material or a metal composite material.

Depending on the type of application the portion of the ring intended for the force introduction can project outwardly or inwardly beyond the sealing surface: if a surface is to sealed toward the outside, the portion of the ring intended for the force introduction is disposed outside, if a breach or a hole is to be sealed, the portion of the ring intended for the force introduction is disposed inside in the hole.

The material of the ring can be of uniform thickness, however it is of advantage that the ring comprises a portion of uniform ring thickness and a portion of decreasing thickness, which extends up to the one edge of the ring, and that onto the portion of the ring decreasing in thickness acts a pressing device. This takes place in order to gain with planar contact surface sufficient clearance for pressing down the ring in its portion projecting beyond the sealing surface.

In order not to require extremely high pressing forces for the arching of the ring, it is therein useful that the portion of the ring decreasing in thickness is wider than the portion of uniform ring thickness.

But the possibility also exists that the decrease of thickness is formed by an oblique surface with the transition of the planar surface into the oblique surface.

It is possible that the decrease in thickness is formed by an offset which in that case forms the annular line-form sealing surface and preferably the portion of the ring decreasing in thickness changing over into the offset through a curved surface in order not to allow tensions in the ring to lead to the formation of tears.

A special advantage of this sealing device is that the ring and thus the sealing surface can have any form, that the ring is formed for example circular, oval, substantially rectangular (with rounded-off corners) or is substantially square (with rounded-off corners).

An especially simple structure is obtained if the pressing device comprises several bolts acted upon by a pressing force. The bolts can be impressed with hydraulic force and be preferably the pistons or piston rods of hydraulic cylinders.

But the option exists also that the bolts are acted upon by mechanically generated forces, preferably the force of a spindle of an eccentric, a wedge, a round key or a screw nut.

A uniform impression can be attained thereby that the bolts are fastened on a ring which is displaceable with hydraulic or mechanical force.

The ring can therein be impressed by a pressing force through the annular piston of an hydraulic pressing device.

The possibility also exists that the ring is pressed by a ring displaced through the mechanical forces of a spindle or screw nut.

In order to prevent abrasion on the sealing surfaces, it is useful that the annular line-form contact surfaces of the ring rest on abrasion rings which are disposed in the sealing surfaces.

Especially advantageous is the use of this sealing device for sealing a strainer or a slider provided with strainers of a strainer-changing device of an extrusion system or for the sealing of a forming-out tool or of a slider provided with forming-out tools of a tool-changing device of an extrusion system.

In order to be able to support the sealing ring so that it is free of displacement, it can be useful that the ring is fixed on the non-sealing edge through a clamp, an offset, a recess or a band.

The impression of the portion of the ring projecting on one side beyond the sealing surface can also lead to undesirable deformations in the ring. These can be through slits in the portion of the ring projecting beyond the sealing surface whose direction extends preferably radially away from the sealing surface.

The invention is described in further detail in conjunction with examples thereof depicted schematically in the drawings which show a number of examples of the invention which can be realized in even further embodiments not depicted in the drawing.

DETAIL DESCRIPTION OF THE INVENTION

Figure 1:
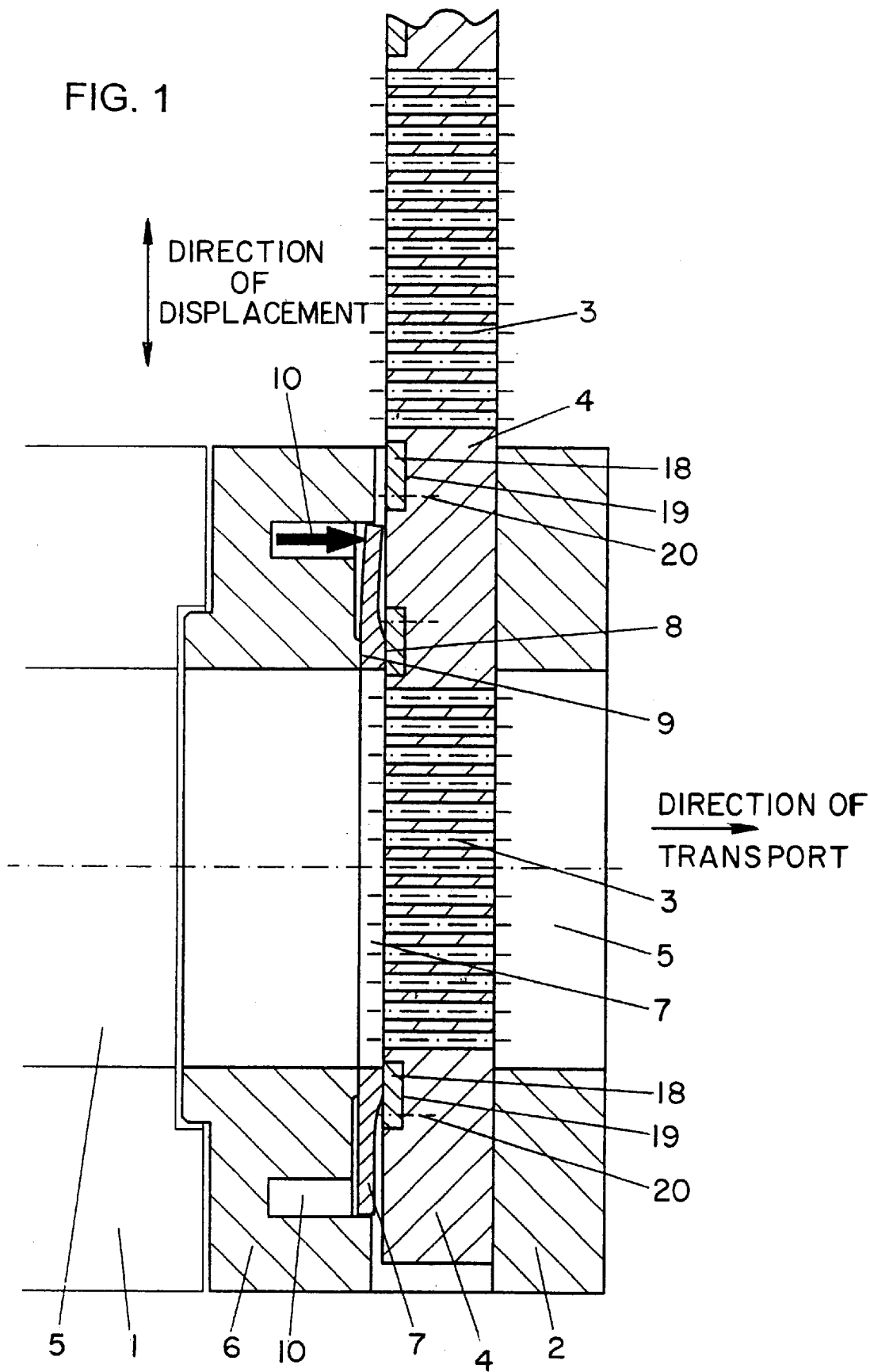
FIG. 1 shows a section through a strainer, in the upper portion of the figure in the pressed-on metal ring, in the lower portion of the drawing in the detached state.
Figure 2:
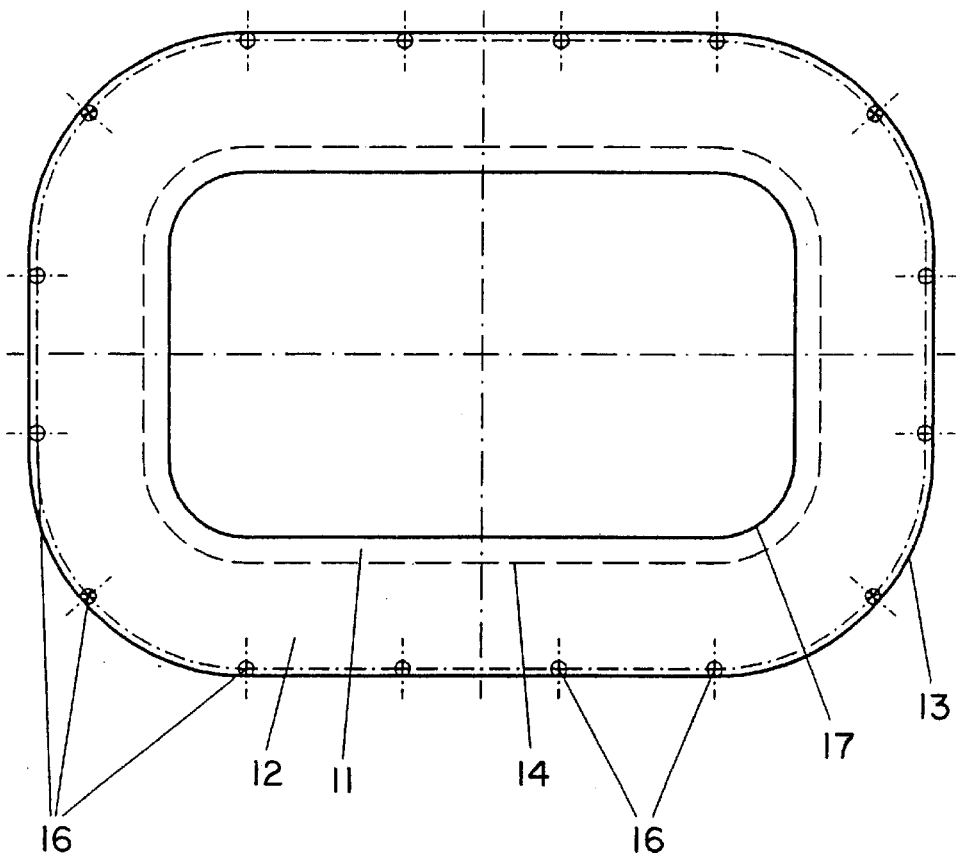
FIG. 2 shows a view of a sealing metal ring with indication of the pressing points.
Figure 3:
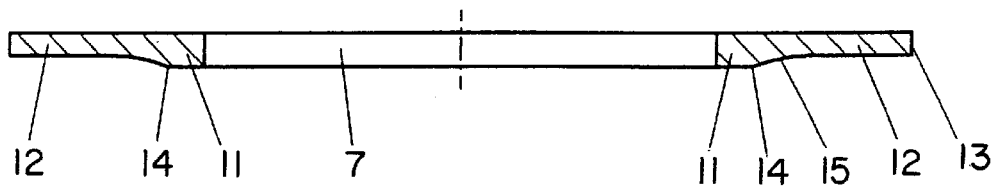
FIG. 3 shows a section through the sealing metal ring.

The sealing device depicted in FIG. 1 is used on extrusion machines, primarily for sealing the slider of a strainer-changing device, but it can also be used on other sites, for example in connections for a discharge-head changer and other attachment parts.

Between an extruder 1 and a counterpiece 2 a slider 4 bearing a strainer 3 is disposed. This requires sealing so that no extrudate can penetrate radially from the transport path 5 through gaps between the slider 4 and the counterpiece 2, on the one hand, and the slider 4 and the extruder 1 or a component 6 applied on extruder 1 for the reception of force introduction tools, on the other hand.

The sealing device comprises a ring 7, disposed between two planar surfaces 8, 9 facing one another, of the machine parts counterpiece 2 and component 6, and a force introduction device 10 depicted by an arrow, which is accommodated in the component 6 between extruder 1 and slider 4 or in the extruder 1 itself.

The ring 7 is fabricated of metal. It comprises a portion 11 of uniform ring thickness and a portion 12 decreasing in thickness, which extends up to the one (outer) edge 13 of the ring. The portion 12 of the ring 7 decreasing in thickness is wider than the portion 11 of uniform ring thickness. The decrease of thickness is formed by an offset 14. The portion 12 of ring 7 decreasing in thickness changes over into offset 14 through a curved surface 15.

The pressing device 10 disposed in component 6 comprises several bolts 16 impressed with a pressing force, which can be acted upon with hydraulic force and which are preferable the pistons or piston rods of hydraulic cylinders. These press down the portion 12 of ring 7 decreasing in thickness and therein deform the entire ring 7 such that the offset 14 rests in contact in the form of a line on slider 4 and the inner marginal edge 17 on component 6 or on the extruder 1 and is pressed onto these. In this way two line-form sealing zones are formed which cannot be overcome by the extrudate from the extruder.

With the pressing of ring 7 onto the two sealing surfaces 8,9 slider 4 is simultaneously pressed on the surface of counterpiece 2 and forms a seal.

The decrease in thickness of ring 7 permits therein the pressing-down of the edge of ring 7 decreasing in thickness up to the plane of the surface of the portion 11, not decreasing in thickness, of uniform ring thickness if the ring 7 rests on a surface of a machine part which extends far beyond the ring.

Since in the region of these line-form sealing zones very high surface pressings can occur which over time can lead to permanent deformations, it is useful to insert as counter bearing hardened metal insets or mechanically resistant metal insets 18 in grooves 19 provided for this purpose in the slider 4 and potentially also in component 6, and to fasten them with screws 20.

Figure 4:
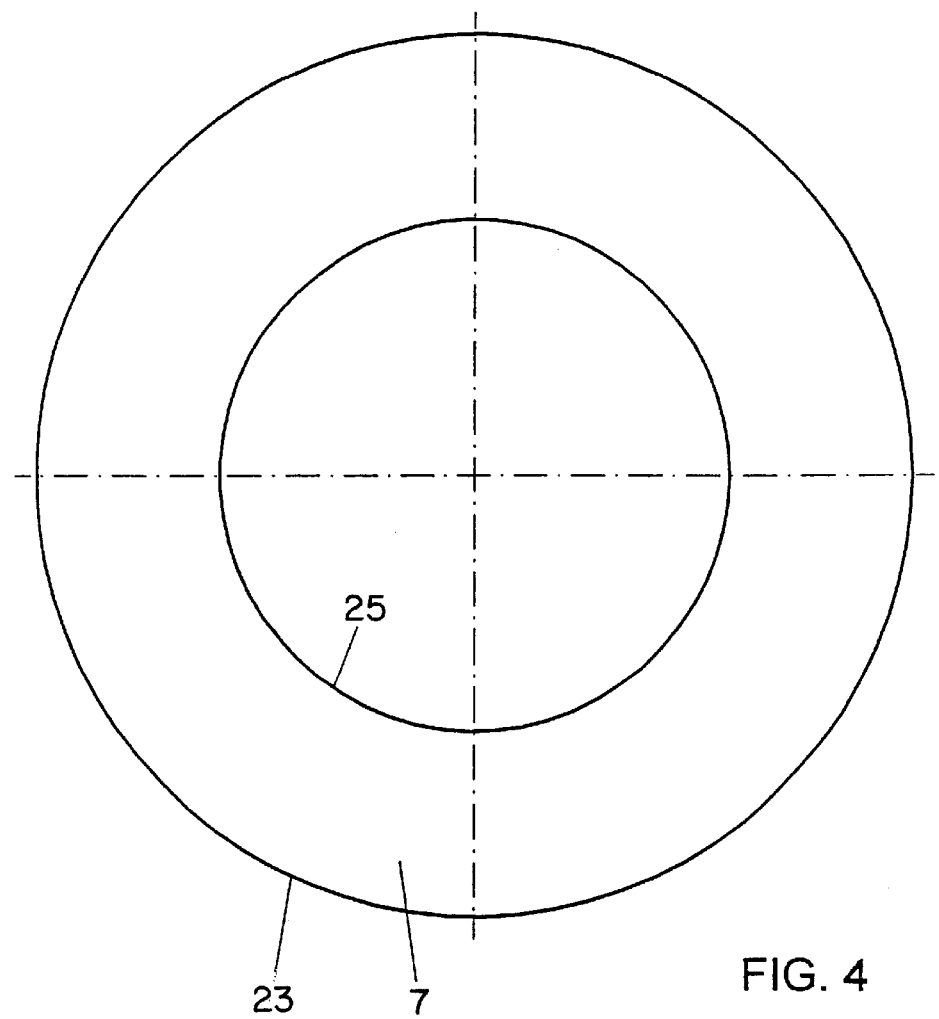
FIG. 4 shows a view of a planar sealing ring.
Figure 5:
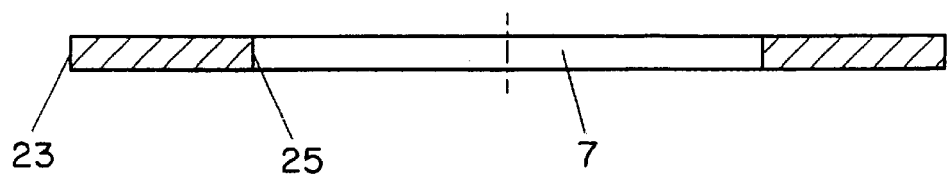
FIG. 5 shows a section through this ring.

FIG. 4 shows a view of a planar sealing ring 7, and in FIG. 5 is shown a section through this ring 7. This sealing ring 7 is fabricated of very strong but elastic metal, and has the simplest form of a ring: It is planar, its inner edge 25 and its outer edge 23 are circular and completely concentric, its thickness is identical at all locations.

Figure 6:
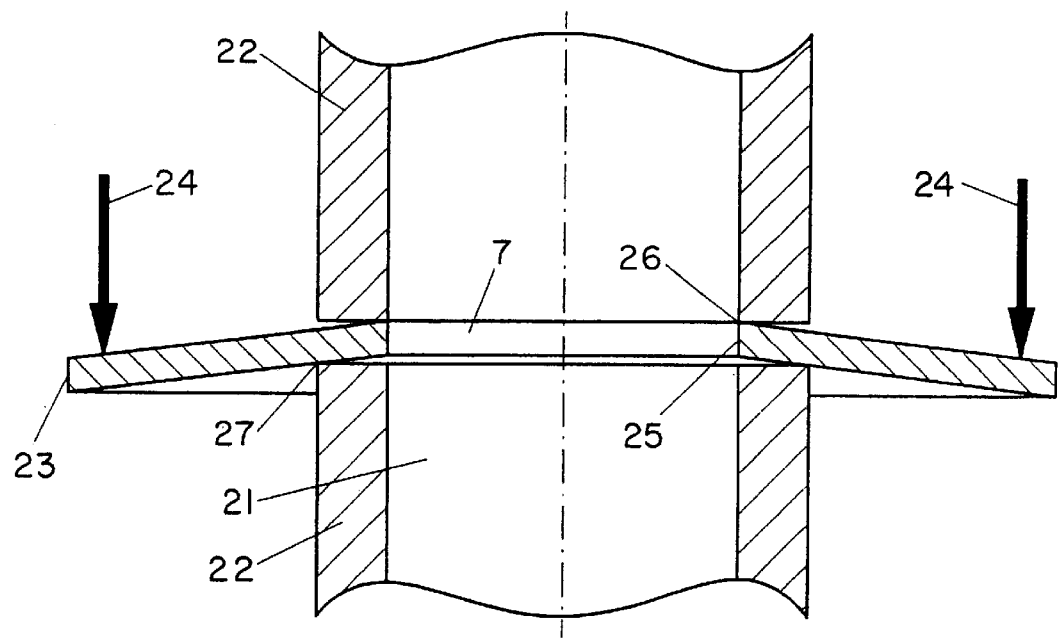
FIG. 6 shows this ring in use for sealing a channel.

FIG. 6 shows this sealing ring 7 in use for sealing a channel 21 formed by two pipes 22 abutting on their front faces. The inner diameter of sealing ring 7 is slightly greater than the diameter of channel 21. The sealing ring 7 projects with its outer edge 23 radially far beyond pipes 22. Forces acting upon this outer portion of sealing ring 7, indicated by arrows 24, cause the sealing ring 7 to arch such that its inner edge 25 rests in contact on the front face of the one (upper) pipe 22 and here acts sealingly on an annular line-form surface 26, while a center portion of sealing ring 7 is in contact on the outer edge of the front face of the (lower) pipe 22 and here acts sealingly on an annular line-form surface 27.

Figure 7:
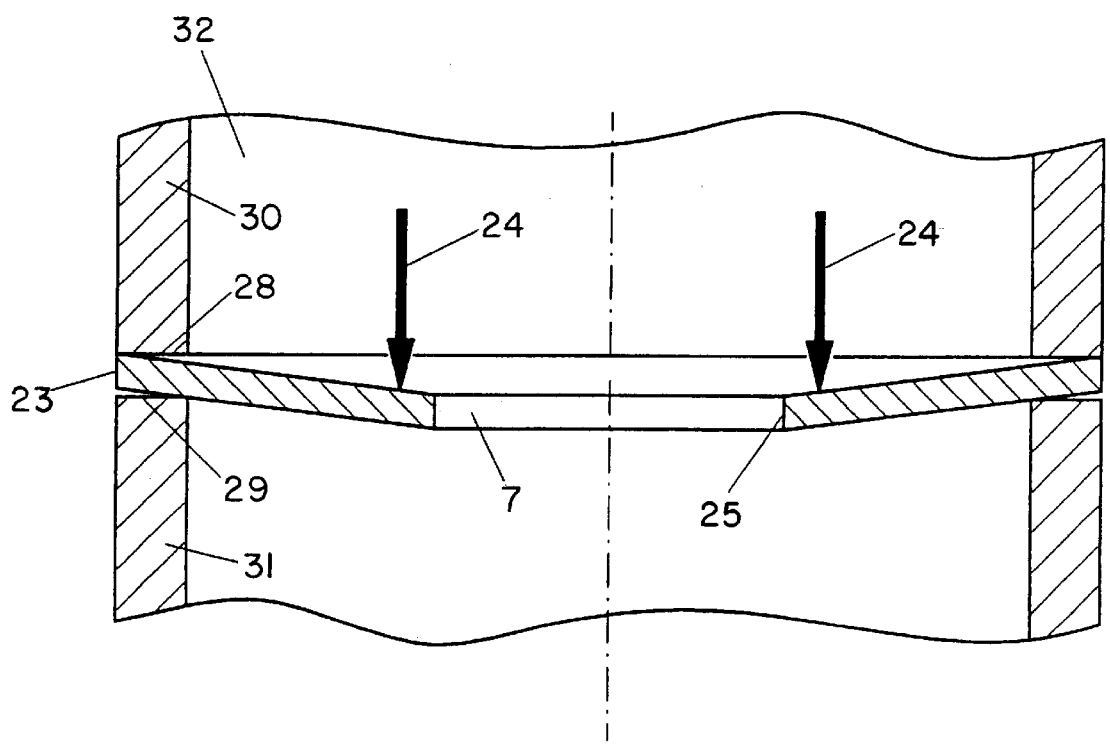
FIG. 7 shows this ring in use for sealing a breach

FIG. 7 depicts this same sealing ring 7 in use for sealing a breach 32 or a hole which penetrates the surfaces 28,29, spaced in parallel at a slight distance, of machine parts 30,31. The outer diameter 23 of this sealing ring 7 is somewhat greater than the inner diameter of the breach 32, the inner diameter of sealing ring 7, however, is considerably smaller than the inner diameter of breach 32. Forces 24 applied by ring element 46 moved by spindle 47 onto the inner portion of sealing ring 7 cause the sealing ring 7 to arch such that its outer edge comes into contact on the surface 28 of the (upper) machine part 30 and forms a very narrow annular surface-form sealing while a center portion rests in contact on the inner edge of surface 29 of the (lower) machine part 31 and here also forms a very narrow annular surface-form sealing.

Figure 8:
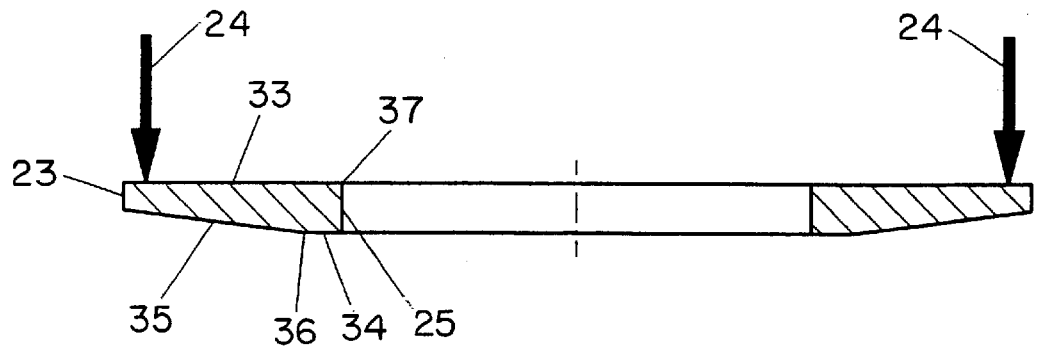
FIG. 8 shows a section through a further sealing ring.

FIG. 8 depicts a section through a further sealing ring 7. This comprises a planar surface 33 on one of its sides and a surface comprising a narrow planar surface 34 and a conical surface 35 adjoining at an obtuse angle, on the other side. On this side consequently a vertex 36 which during operation forms the one annular line-form sealing surface while the other annular line-form sealing surface is formed by the inner edge 37 of the surface 33 on the opposing side of sealing ring 7.

The decrease in thickness of ring 7 permits therein a pressing-down of the edge of ring 7 decreasing in thickness into the plane of the surface of the portion, not decreasing in thickness, of uniform ring thickness if the ring 7 rests in contact on a planar surface of a machine part which extends far beyond the ring.

Figure 9:
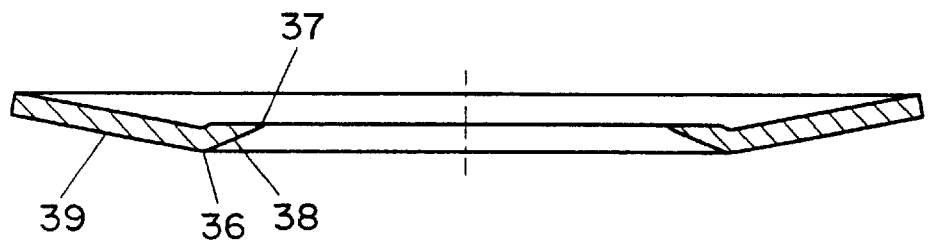
FIG. 9 shows a section through a sealing ring in the form of a double truncated cone.

FIG. 9 shows a section through a double truncated cone-form sealing ring which is fabricated as a punched or pressed part of a metal sheet. A narrow inner conical portion 38 meets in the vertex 36 and conical portion 39 is broader externally. The vertex 36 forms the one annular line-form sealing surface while the other annular line-form sealing surface is formed by the inner edge 37 of sealing ring 7 on the opposing side of sealing ring 7.

Figure 10:
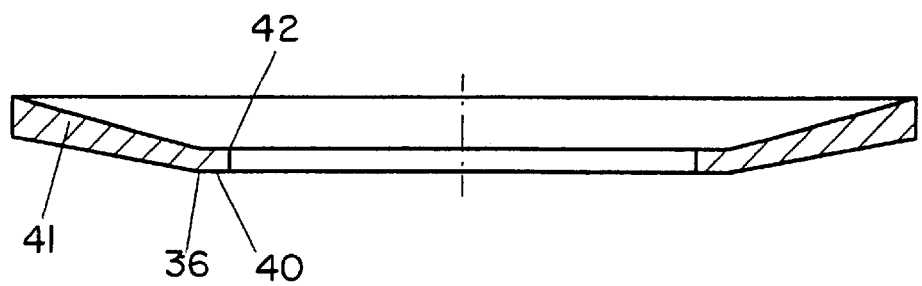
FIG. 10 shows a section through a sealing ring formed by a planar center region and a conical outer ring region expanding in its material thickness.

FIG. 10 shows a section through a sealing ring 7 formed by a planar center region 40 and a conical outer ring region 41 expanding in its material thickness. The vertex 36 forms here also the one annular line-form sealing surface while the other annular line-form sealing surface is formed by the inner edge 42 of sealing ring 7 on the opposing side of sealing ring 7.

Figure 11:
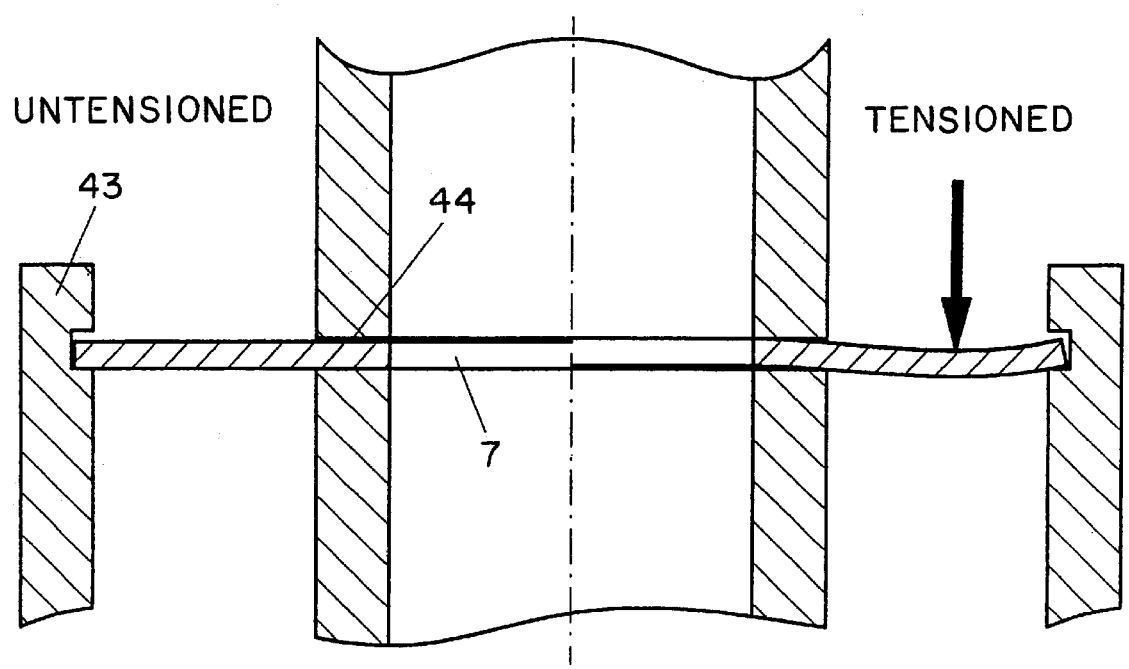
FIG. 11 shows a ring clamped on its edge outside of the sealing surface.

FIG. 11 shows a ring 7 clamped outside by means of a clamp 43, which is acted upon by force in the region between the sealing surface 44 and the clamp 43.

The acting by force upon the portion of the ring projecting on one side beyond the sealing surface can also lead to undesirable deformations in the ring which can be limited through slits in the portion of the ring projecting on one side beyond the sealing surface, whose direction extends preferably radially away from the sealing surface.

Figure 12:
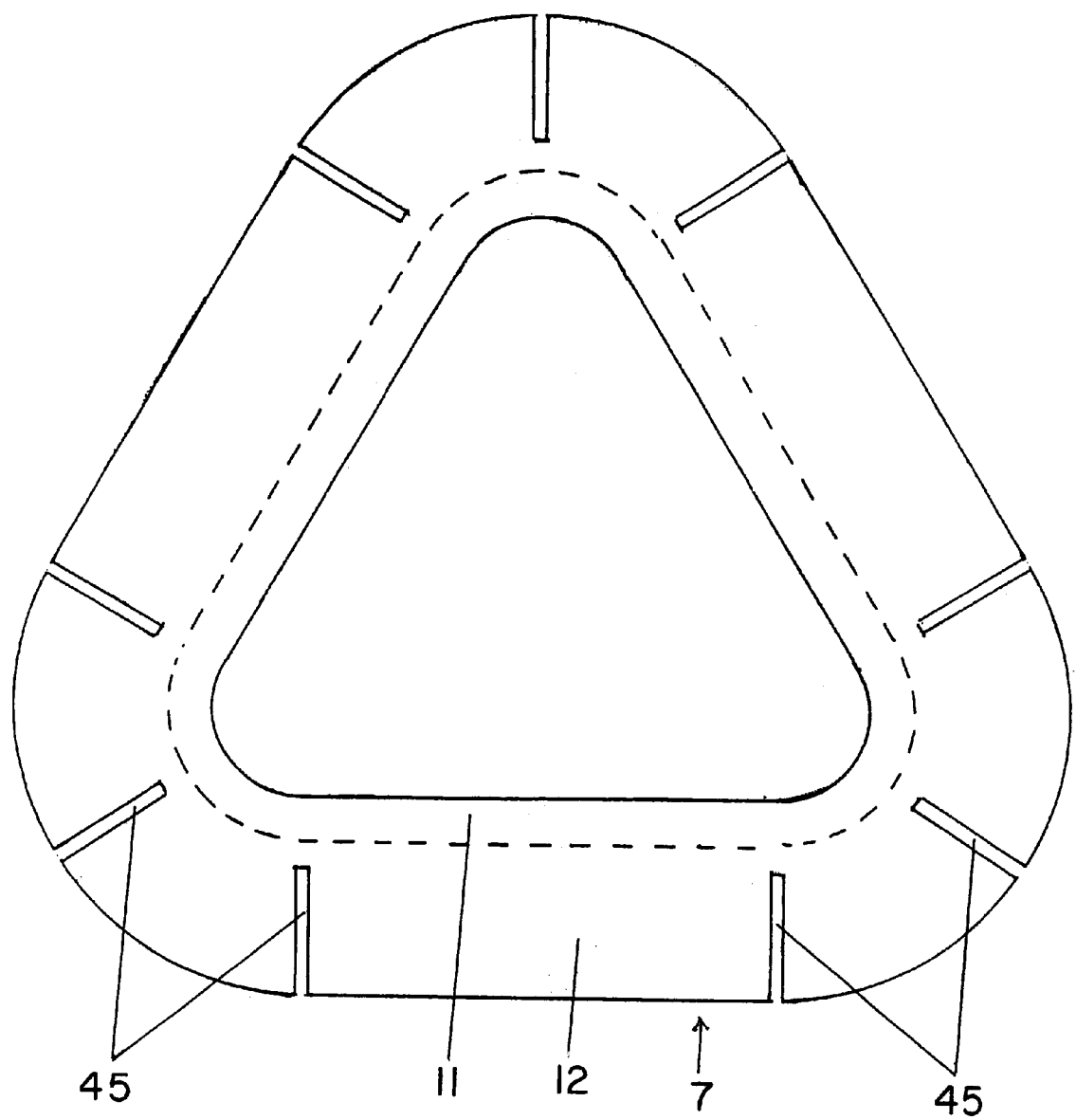
FIG. 12 shows a ring provided with slits.

FIG. 12 shows a triangular ring with such slits 45. In a ring of this type, which comprises straight-line and curved surfaces and which, in the non-tensioned or non loaded state is planar, the undesirable tensions and deformations appear preferably in the curved surfaces and in the transitions from the curved surfaces into the straight surfaces. The impression with force in such slit rings must take place on each surface between two slits.

What is claimed is:

1. Device for sealing an annular gap between two planar sealing surfaces of machine parts, with the aid of a ring which rests in contact with said two planar sealing surfaces; said device comprising an elastic ring (7) made of a very strong material, and by means of a pressing device for deforming said ring, a portion (12) of said ring (7) projecting beyond the sealing surfaces is deformed such that said portion (12) becomes arched for sealing said gap or stretches back out of an arched state for canceling the gap sealing, and that said ring (7) in the arched state rests in contact on each of the two planar sealing surfaces (8,9) in the form of an annular line for sealing said annular gap; and wherein said ring (7) in a tension-less state is a planar ring and which through the impression of force becomes arched on its margin projecting beyond the sealing surface.

2. Device for sealing an annular gap between two planar sealing surfaces of machine parts, with the aid of a ring which rests in contact with said two planar sealing surfaces;

said device comprising an elastic ring (7) made of a very strong material, and by means of a pressing device for deforming said ring, a portion (12) of said ring (7) projecting beyond the sealing surfaces is deformed such that said portion (12) becomes arched for sealing said gap or stretches back out of an arched state for canceling the gap sealing, and that said ring (7) in the arched state rests in contact on each of the two planar sealing surfaces (8,9) in the form of an annular line for sealing said annular gap; and wherein said ring (7) in the region between said two sealing surfaces (8,9), is substantially planar and is arched through pressure onto said portion (12) projecting beyond its sealing surface, such that surfaces (26,27) of said ring (7) are in contact under pressure on said two sealing surfaces.

3. Device for sealing an annular gap between two planar sealing surfaces of machine parts, with the aid of a ring which rests in contact with said two planar sealing surfaces; said device comprising an elastic ring (7) made of a very strong material, and by means of a pressing device for deforming said ring, a portion (12) of said ring (7) projecting beyond its sealing surfaces is deformed such that said portion (12) becomes arched for sealing said gap or stretches back out of an arched state for canceling the gap sealing, and that said ring (7) in the arched state rests in contact on each of the two planar sealing surfaces (8,9) in the form of an annular line for sealing said annular gap; and wherein said ring (7) comprises a uniformly thick ring portion (11) and a portion (12) of decreasing thickness, which extends up to a margin (13) of said ring (7), and that on said portion (12) of said ring (7) decreasing in thickness said pressing device (10) acts for the impression of force of said ring (7); and that said portion (12) of said ring (7) decreasing in thickness is broader than said portion (11) of uniform ring thickness.

4. Device for sealing an annular gap between two planar sealing surfaces of machine parts, with the aid of a ring which rests in contact with said two planar sealing surfaces; said device comprising an elastic ring (7) made of a very strong material, and by means of a pressing device for deforming said ring, a portion (12) of said ring (7) projecting beyond its sealing surfaces is deformed such that said portion (12) becomes arched for sealing said gap or stretches back out of an arched state for canceling the gap sealing, and that said ring (7) in the arched state rests in contact on each of the two planar sealing surfaces (8,9) in the form of an annular line for sealing said annular gap; and wherein said ring (7) comprises a uniformly thick ring portion (11) and a portion (12) of decreasing thickness, which extends up to a margin (13) of said ring (7), and that on said portion (12) of said ring (7) decreasing in thickness said pressing device (10) acts for the impression of force of said ring (7); and that the decrease in thickness is formed by offset (14), wherein said portion (12) of said ring (7) decreasing in thickness changes over into the offset (14) through a curved surface.

5. Device for sealing an annular gap between two planar sealing surfaces of machine parts, with the aid of a ring which rests in contact with said two planar sealing surfaces; said device comprising an elastic ring (7) made of a very strong material, and by means of a pressing device for deforming said ring, a portion (12) of said ring (7) projecting beyond its sealing surfaces is deformed such that said portion (12) becomes arched for sealing said gap or stretches back out of an arched state for canceling the gap sealing, and that said ring (7) in the arched state rests in contact on each of the two planar sealing surfaces (8,9) in the form of an annular line for sealing said annular gap; and wherein said ring (7) is pressed by a ring displaced by mechanical forces of a spindle or screw nut.

6. Device for sealing an annular gap between two planar sealing surfaces of machine parts, with the aid of a ring which rests in contact with said two planar sealing surfaces; said device comprising an elastic ring (7) made of a very strong material, and by means of a pressing device for deforming said ring, a portion (12) of said ring (7) projecting beyond its sealing surfaces is deformed such that said portion (12) becomes arched for sealing said gap or stretches back out of an arched state for canceling the gap sealing, and that said ring (7) in the arched state rests in contact with each of the two planar sealing surfaces (8,9) in the form of an annular line for sealing said annular gap, and with a contact surface of said ring (7) resting on a hardened counter bearing inset (18) provided beneath said ring (7).

7. Device for sealing an annular gap between two planar sealing surfaces of machine parts, with the aid of a ring which rests in contact with said two planar sealing surfaces; said device comprising an elastic ring (7) made of a very strong material, and by means of a pressing device for deforming said ring, a portion (12) of said ring (7) projecting beyond its sealing surfaces is deformed such that said portion (12) becomes arched for sealing said gap or stretches back out of an arched state for canceling the gap sealing, and that said ring (7) in the arched state rests in contact with each of the two planar sealing surfaces (8,9) in the form of an annular line for sealing said annular gap; and wherein said ring (7) is provided with slits (45) in an area of the ring (7) projecting on one side beyond the two planar sealing surfaces, and in a direction extending radially away from the sealing surfaces.

\* \* \* \* \*